United States Patent [19]

Kuwayama et al.

[11] Patent Number: 4,875,392
[45] Date of Patent: Oct. 24, 1989

[54] MANUAL VALVE IN AN AUTOMATIC TRANSMISSION

[75] Inventors: Yoshinari Kuwayama, Tokoname; Fumitomo Yokoyama, Anjo; Masakatsu Miura, Kariya, all of Japan

[73] Assignee: Aisin-Warner Kabushiki Kaisha, Aichi, Japan

[21] Appl. No.: 172,724
[22] PCT Filed: Jun. 30, 1987
[86] PCT No.: PCT/JP87/00453
   § 371 Date: Mar. 1, 1988
   § 102(e) Date: Mar. 1, 1988
[87] PCT Pub. No.: WO88/00303
   PCT Pub. Date: Jan. 14, 1988

[30] Foreign Application Priority Data

Jul. 1, 1986 [JP] Japan ............... 61-154694

[51] Int. Cl.⁴ .................................. B60K 41/16
[52] U.S. Cl. .................................. 74/867
[58] Field of Search .............. 74/868, 867, 869

[56] References Cited

U.S. PATENT DOCUMENTS

| | | | |
|---|---|---|---|
| 3,465,614 | 9/1969 | Reynolds | 74/869 X |
| 3,546,974 | 12/1970 | Fox et al. | 74/869 |
| 3,651,714 | 3/1972 | Ohya et al. | 74/869 X |
| 3,710,638 | 1/1973 | Sakai | 74/867 X |
| 3,823,621 | 7/1974 | Kubo et al. | 74/869 X |
| 3,895,542 | 7/1975 | Miyauchi | 74/868 |
| 3,902,380 | 9/1975 | Murakami | 74/868 |
| 4,462,280 | 7/1984 | Sugano et al. | 74/868 |
| 4,488,457 | 12/1984 | Nishimura et al. | 74/868 |
| 4,660,441 | 4/1987 | Young | 74/867 |
| 4,754,666 | 7/1988 | Inagaki | 74/867 |

FOREIGN PATENT DOCUMENTS 58-99543 6/1983 Japan .
62-93545 4/1987 Japan .
62-93546 4/1987 Japan .

Primary Examiner—Dirk Wright
Attorney, Agent, or Firm—Wenderoth, Lind & Ponack

[57] ABSTRACT

A manual valve which is used for an automatic transmission is designed to be shortened axially.

A port for reverse running and the ports for forward running are made on the same axial direction against ports for the port for line pressure application.

A spool has; a first oil chamber which connects the port for line pressure application and the ports for forward running, a second oil chamber which connects the port for reverse running and the port for line pressure application or a drain hole, and a drain path connecting the ports for forward running and the drain portion.

4 Claims, 5 Drawing Sheets

MANUAL VALVE IN AN AUTOMATIC TRANSMISSION

BACKGROUND OF THE INVENTION

1. Field of the Invention

The present invention relates to a manual valve which is shortened axially, and suitable for an automatic transmission for an automobile particularly to a F.F. (front engine, front drive) mounted small type car.

2. Description of the Prior Art

A manual valve in an automatic transmission has a spool comprising a cylindrical "land" portion and a circular "groove" portion, and ports for forward running and a port for reverse running which are located in the same axial direction along a port for line pressure application.

As shown in FIG. 12, a previously proposed manual valve V' has an oil chamber 5'a in a connecting area, so that the distance between a port R and a port D is shortened; however, a port $P_L$ for a line pressure application is still located between the port for reverse running (R) and the ports for forward running (D, 3, 2 and 1). Due to the above, a certain length is necessary from the port for line pressure application $P_L$ to both the port R for reverse running and ports D, 3, 2 and 1 for forward running particularly port 1, so that the case or valve body where each port is located becomes long axially, so that a large space is required.

In particular, recently due to the requirements of front-engine-front-drive and high efficiency, an automatic trnsmission has been required to be small sized and be a multiple-speed transmission. Under such circumstances, in such a small sized and multiple-speed transmission, a shortened manual valve is required because the installation space in a trans axle case is limited.

The present invention proposes to shorten the manual valve by setting the ports for forward running and the port for reverse running in the same axial direction from the port for line pressure application.

SUMMARY OF THE INVENTION

It is therefore an object of the present invention to provide a manual valve which comprises: a port for reverse running and ports for forward running in the same axial direction from a port for line pressure application; a spool having a first oil chamber connecting the line pressure application port and each forward running port; a second oil chamber connecting the reverse running port and the line pressure application port, or a drain portion; and a drain path connecting each forward running port and the drain portion.

Based on the structure described above, when a vehicle runs forward, the spool will be positioned corresponding to one of the forward running ports of the manual valve, line pressure from the line pressure application port is applied to the ports corresponding to each forward speed through the first oil chamber.

When a vehicle runs in reverse, the spool is positioned corresponding to the reverse running port of the manual valve, and line pressure from the line pressure application port is applied to the reverse port through the second oil chamber.

As explained, the present invention shows that, in the manual valve, the ports for forward running and the ports for reverse running are positioned in the same axial direction from the port for line pressure application, so that the overall length, particularly the area where the ports are located, is shortened.

DESCRIPTION OF THE PREFERRED EMBODIMENT

The following is a description of an embodiment of a valve in accordance with the present invention.

Figure 3:
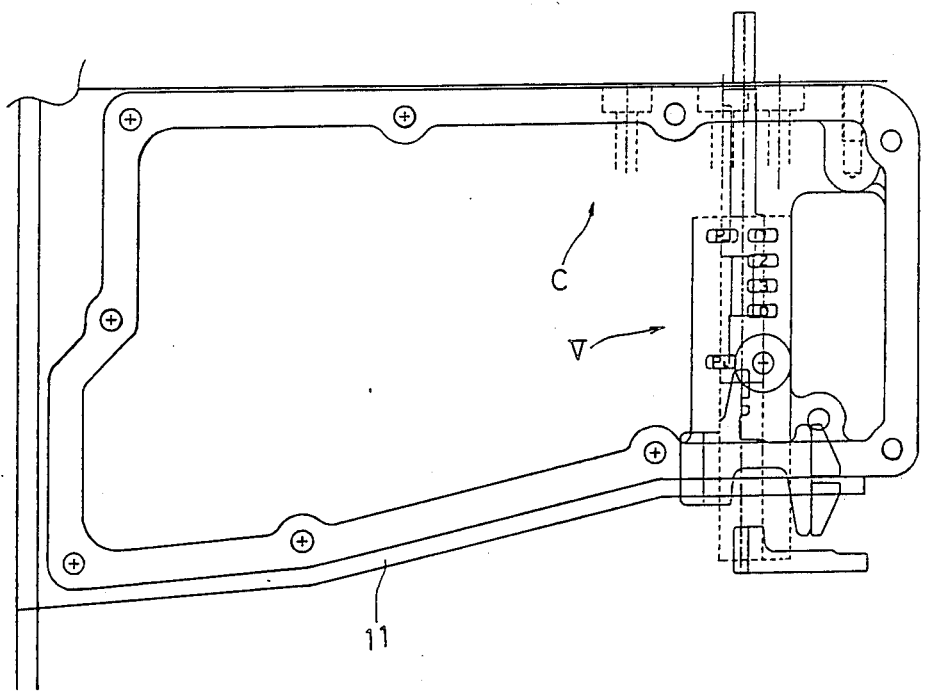
FIG. 3 is a plan view of a trans axle case in which the manual valve of FIG. 2 is installed.

A manual valve V installed in a trans axle case shown in FIG. 3 is used for a small and multiple-speed automatic transmission particularly for use in a 5 forward speed automatic transmission and which an applicant of the present invention disclosed in Japanese patent applications 60-230809 and 60-230810, now Laid Open Applications Nos. 62-93545 and 62-93546 of Apr. 30, 1987.

Figure 2:
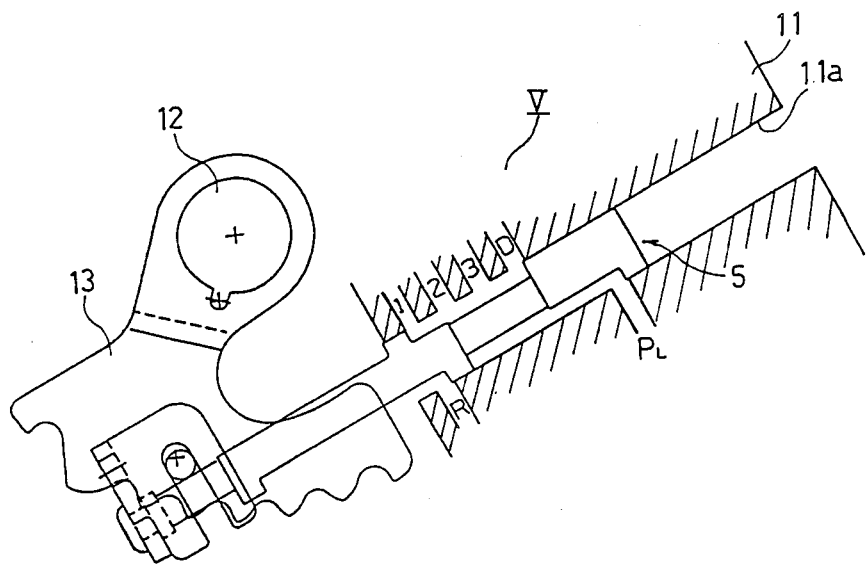
FIG. 2 is an overall cross sectional view of the manual valve of FIG. 1.

In the trans axle case 11, the manual valve is installed transversely shown in FIG. 3 because the automatic transmission is quite small, so that C portion having other valves shown in FIG. 3, is not available for providing ports of the manual valve, and the center of the manual valve installed transversely has ports for forward and reverse, and a port for line pressure application $P_L$. As shown in FIG. 2, the case 11 has a valve bore 11a, and in the bore 11a, a spool 5 is freely slidably inserted to provide a slide motion. Furthermore, one of the ends of the spool 5 is linked to a part 13 which is fixed to a shaft 12 so that spool 5 can be moved axially and cannot rotate around its axis, and the shaft 12 is linked to a shift lever near a driver's seat.

Figure 1:
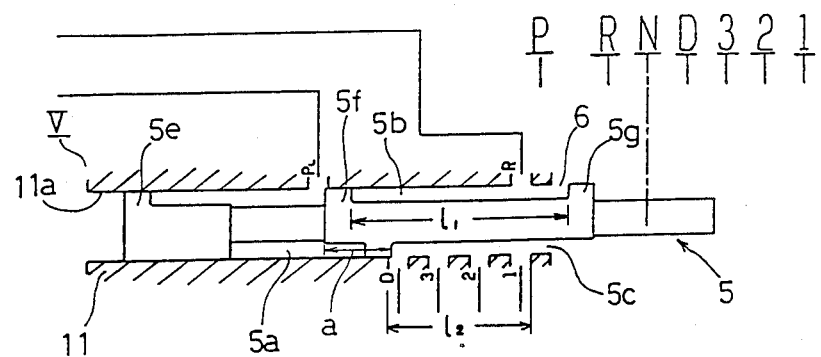
FIG. 1 is a schematic cross sectional view of a manual valve according to the present invention.

As shown in FIG. 1, the case 11 has ports D, 3, 2 and 1 corresponding to the operating positions of the shift lever "D-3-2-1", has a port R corresponding to a reverse operating position R of the shift lever, and a port for line pressure application $P_L$. In the edge of the valve bore 11a, a drain portion 6 is provided. The forward ports D, 3, 2 and 1 are located on one side in the valve bore 11a, and the reverse port R and the port $P_L$ are located on the opposite side of the valve bore 11a and the spool 5; each forward port and the reverse port are located on the same axial side of the port $P_L$ for line pressure application.

The forward port 1 and the reverse port R which are at the farthest port from the port $P_L$ are in the same transverse plane of the valve bore 11a.

The spool 5 has step-like projections (hereinafter called "land portions") namely a first land portion 5e and a second land portion 5f, the spool having a reduced diameter portion therebetween defining an oil chamber 5a for forward operation having different patterns of oil flowing on both sides of the valve bore 11a. Third land portion 5g is spaced along the spool from the second land portion 5f and the spool has a circular segmental cross-sectional shape reduced diameter portion extending from the land portion 5g in axial direction to the land portion 5f to define between the third land portion 5g and the second land portion 5f an oil chamber 5b for reverse operation; on the opposite side of the land portion 5g from chamber 5b is a drain chamber 5c formed by a further circular segmental cross-sectional shape reduced diameter portion. The length $l_1$ of the oil chamber 5b is equal to that from the port $P_L$ (left side) to the port R (right side), and also that from the port $P_L$ (right side) to the drain portion 6 (the edge of the case 11). The length $l_1$ is longer than that of $l_2$ from the left side of port D to the right side of the port 1. Furthermore, the length "a" which is a sum of off-sets, a covering area of the ports, of land portion 5f and thickness of 5f, extends from the right side of the port $P_L$ to the left side of the port D.

Figure 4:
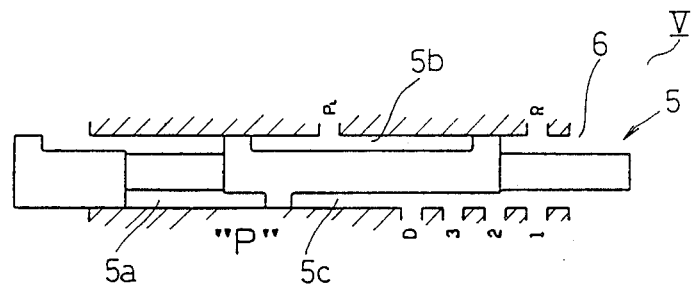
FIGS. 4–10 are schematic views showing the positions of the manual valve for various drive conditions.

As this embodiment has structure described above, in the parking position shown in FIG. 4, the port $P_L$ opens into the oil chamber 5b (for reverse), which is not connected to any other ports; the reverse port R and the forward ports (D, 3, 2 and 1) are connected to the drain portion 6, the forward ports D, 3 and 2 opening into drain chamber 5c.

Figure 5:
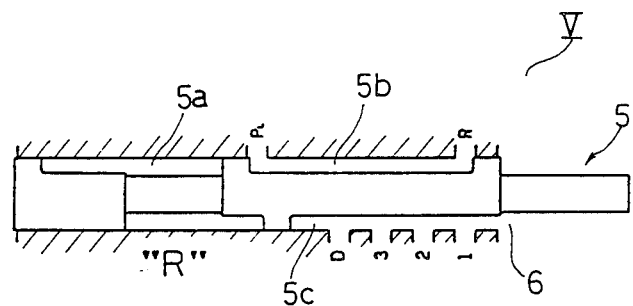

In the reverse position shown in FIG. 5, the forward ports are still connected to the drain portion 6 through drain chamber 5c, the port $P_L$ is connected to the reverse port R through the chamber 5b.

Figure 6:
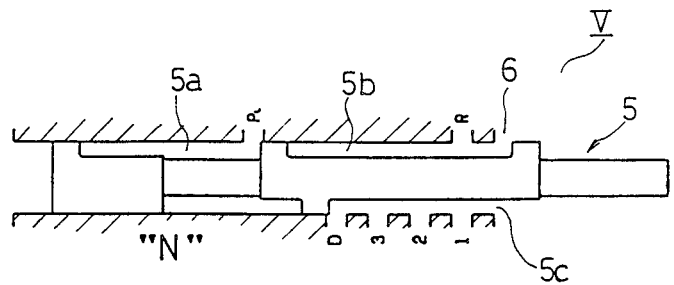

In the neutral position shown in FIG. 6, the port $P_L$ for line pressure application opens into the oil chamber 5a (for forward), which is not connected to any other ports, the reverse port R is connected to the drain portion 6 through the oil chamber 5b (for reverse) and the forward ports (D, 3, 2 and 1) are connected to the drain portion 6 through the drain chamber 5c.

Figure 7:
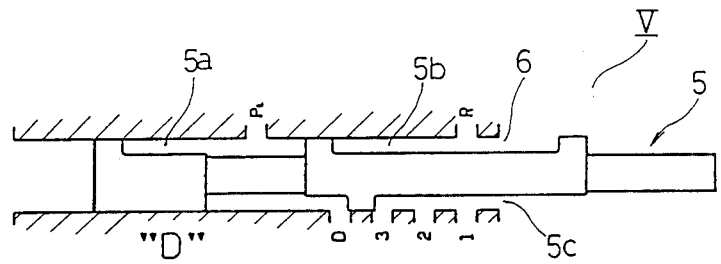

In the D position shown in FIG. 7, the port $P_L$ is connected to the port D through chamber 5a, and the reverse port R and the forward ports (1, 2 and 3) are connected to the drain portion 6.

Figure 8:
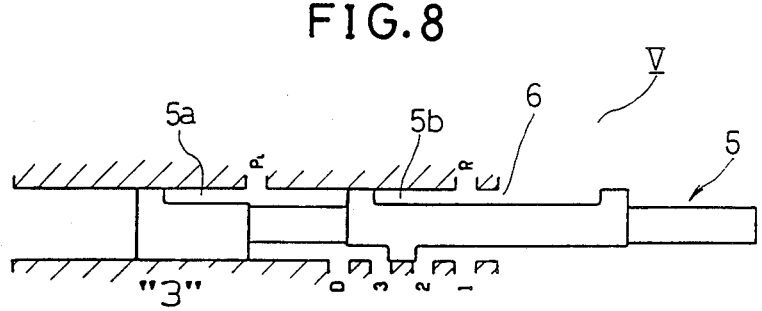

In the 3 position shown in FIG. 8, the reverse port R and the forward ports (1 and 2) are connected to the drain portion 6, and the port $P_L$ is connected to the ports D and 3 through the chamber 5a.

Figure 9:
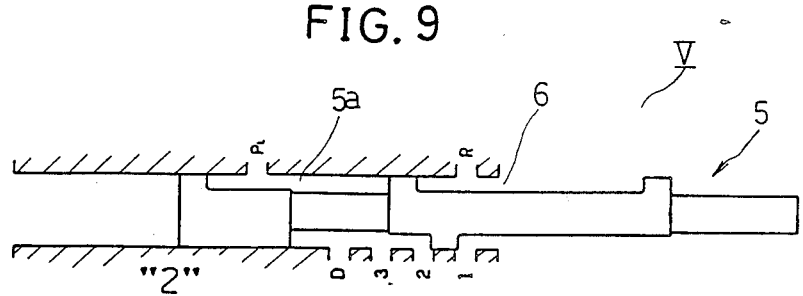

In the 2 position shown in FIG. 9, the reverse port R and the forward port 1 are connected to the drain portion 6, and the port $P_L$ is connected to the ports D, 3, 2 and 1 through the chamber 5a.

Figure 10:
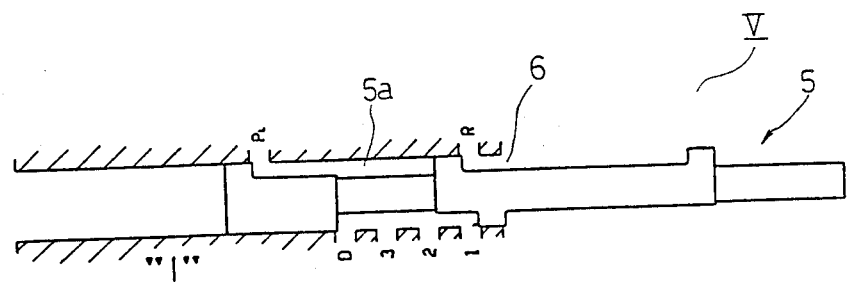

In the 1 position shown in FIG. 10, the reverse port R is connected to the drain portion 6, and the port $P_L$ is connected to the forward ports D, 3, 2, and 1 through the chamber 5a.

Figure 11:
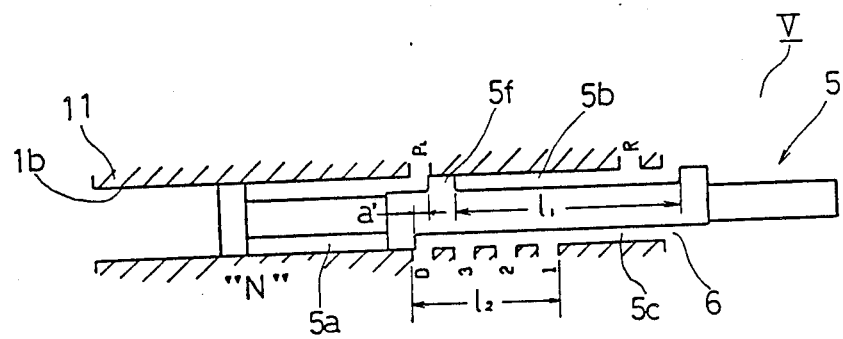
FIG. 11 is a cross sectional view of another embodiment of the valve of the present invention.
Figure 12:
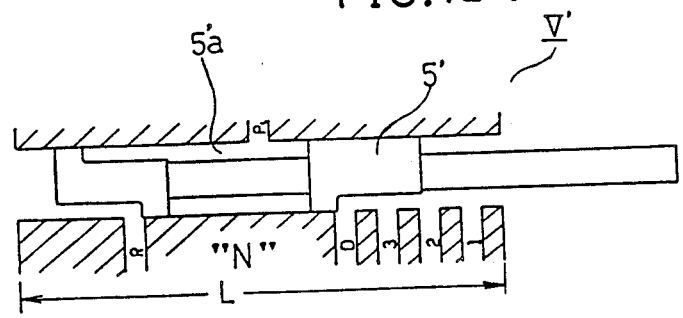
FIG. 12 is a cross sectional view of a previously proposed valve.

A second embodiment is explained below in connection with FIG. 11.

In this embodiment, the port $P_L$ for line pressure application and reverse port R, and the forward ports (D, 3, 2 and 1) have similar relative positions as the corresponding ports in FIGS. 1–10, and the reverse port R and the forward ports (D, 3, 2 and 1) are located on the same side of the port for line pressure application $P_L$. However, ports D, 1, 2 and 3 are shifted in the axial direction of bore 11a toward port $P_L$ so that the port $P_L$ and the forward port D are in the same transverse plane. The spool 5 has the oil chamber 5a (for forward), the oil chamber 5c (for reverse) and drain chamber 5c. The length of the chamber 5b, $l_i$, and the length between the port $P_L$ and the port R and the drain portion 6, and the overall length of the forward ports $l_2$; the relation ($l_1 > l_22$) is the same as in the previous embodiment; however, the off-set of "land portion" 5f whose length of the port $P_L$ side is longer than that of the forward port D, and the length "a", i.e., the off-set amount minus the thickness of 5f is the same as the width of the port $P_L$ and the port D; these are different from the previous embodiment.

FEASIBILITY FOR THE RELATED INDUSTRIES

A manual valve installed in an automatic transmission related to the present invention can be used for automobiles, trucks, small sized cars, special purpose vehicles and cars in general. And the most suitable application is for an automatic transmission which is small sized and has a five-speed multiple transmission with a front-engine-front-drive system.

We claim:

1. A manual valve for an automatic transmission, comprising:
   a valve body having a valve bore therein;
   a plurality of forward running ports for delivering fluid for forward running of said transmission, a reverse running port for delivering fluid for reverse running of said transmission, and a single line pressure application port for supplying fluid at line pressure, all of said ports opening into said bore, and a drain opening out of said bore; and
   a spool having recesses therein for connecting said ports to and disconnecting said ports from each other;
   said reverse running port and said forward running ports and said drain all being positioned in the same axial direction along said valve bore from said single line pressure application port, and said forward running ports being along a peripheral portion of said valve bore which is substantially on the circumferentially opposite side of said valve bore from said reverse running port and said single line pressure application port; and
   said spool having a reduced diameter portion forming a first fluid chamber connecting said single line pressure application port and said forward running ports in the various positions of said spool for forward running of said transmission, a second fluid chamber defining recess along a circumferential portion of said spool opposed to said single line pressure applying port and said reverse running port for connecting said reverse running port and said single line pressure application port in the reverse running position of said spool and connecting said reverse running port and said drain in the running positions of said spool, and a drain chamber defining recess along a circumferential portion of said spool opposed to said forward running ports for connecting said forward running ports to said drain in the positions of the spool other than positions in which the respective forward running ports are connected with said single line pressure application port through said first fluid chamber.

2. A manual valve as claimed in claim 1 in which said second fluid chamber defining recess and said drain chamber defining recess overlapping each other in the axial direction of said spool.

3. A manual valve as claimed in claim 1 in which said reverse running port and the running port farthest from said single line pressure application port along said valve bore are in substantially the same plane transverse to the direction of the length of said valve bore.

4. A manual valve as claimed in claim 1 in which said running port closest to said line pressure application port and said line pressure application port are in substantially the same plane transverse to the direction of the length of said valve bore.

* * * * *